United States Patent
Montgomery

[15] 3,637,364
[45] Jan. 25, 1972

[54] BATH TEMPERATURE CONTROL IN FLOAT GLASS APPARATUS

[72] Inventor: Eldwin C. Montgomery, Modesto, Calif.
[73] Assignee: Libbey-Owens-Ford Company, Toledo, Ohio
[22] Filed: Nov. 21, 1969
[21] Appl. No.: 878,751

[52] U.S. Cl. ...................65/65 A, 65/99 A, 65/161, 65/162, 65/182 R
[51] Int. Cl. .........................................................C03b 18/02
[58] Field of Search ............65/29, 65 A, 99 A, 160, 161, 65/162, 163, 182, 182 R

[56] References Cited

UNITED STATES PATENTS

| | | |
|---|---|---|
| 3,047,647 | 7/1962 | Harkins et al. ........................65/11 K |
| 3,332,765 | 7/1967 | Champlin ..............................65/162 |
| 3,511,627 | 5/1970 | Flori ....................................65/162 X |
| 3,531,274 | 9/1970 | Dickinson et al. ....................65/162 X |

Primary Examiner—Arthur D. Kellogg
Attorney—Elmer L. Collins and Phillip S. Oberlin

[57] ABSTRACT

Stabilizing the dimensions of the equilibrium ribbon formed by controlling the temperature of the glass layer in the tank of a float glass apparatus. The power input to electric heating elements within the tank is modulated in response to direct measurement of the temperature of the glass layer. The radiant energy emitted by the surface of the glass layer is directly sensed and transformed into an electrical signal corresponding to the temperature of the surface. This signal is compared by suitable control means with that of a predetermined set point, and differences therebetween initiate a response from electrical control means to correct deviations by appropriately increasing or decreasing the power input to the heating elements.

8 Claims, 8 Drawing Figures

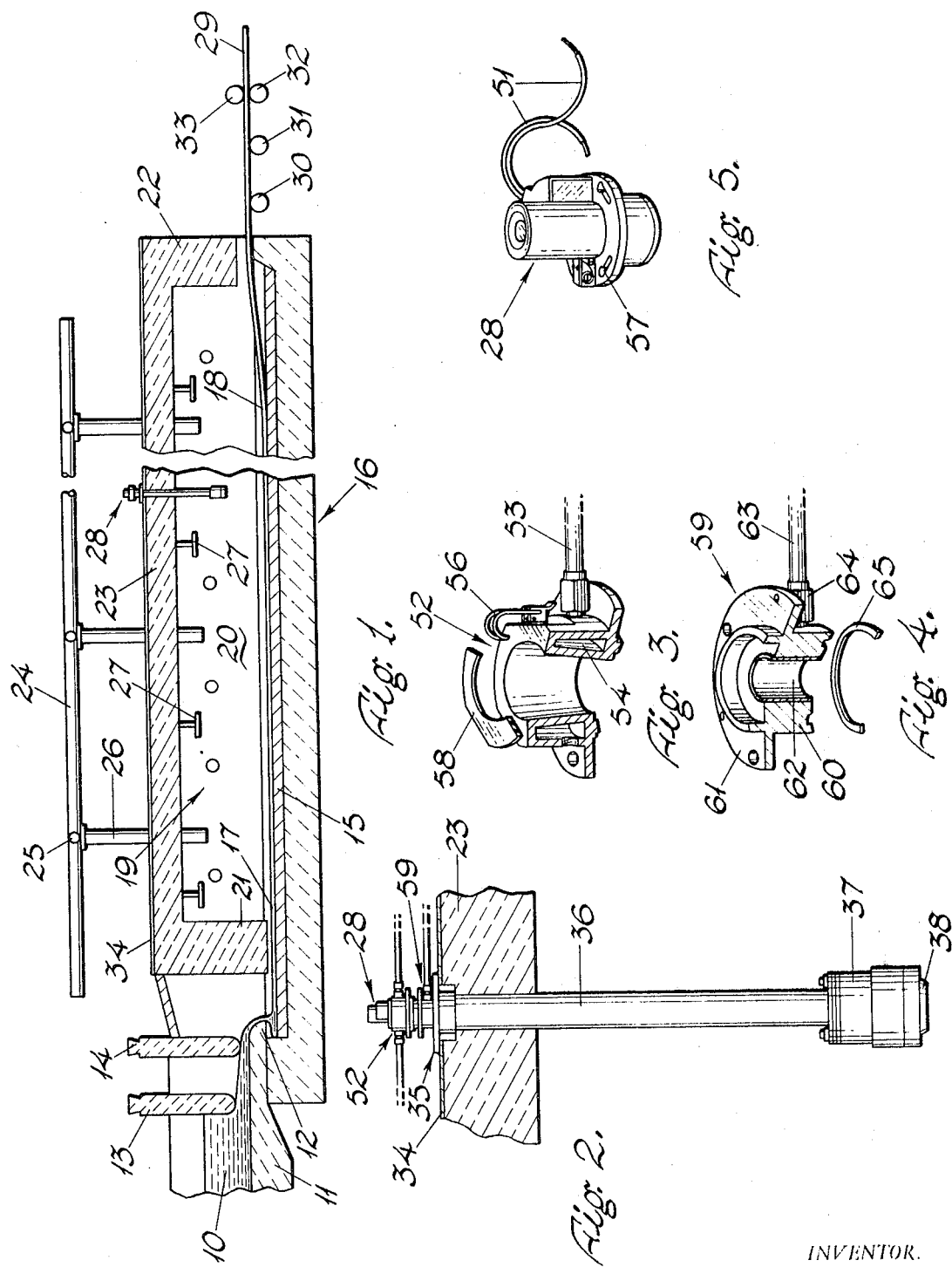

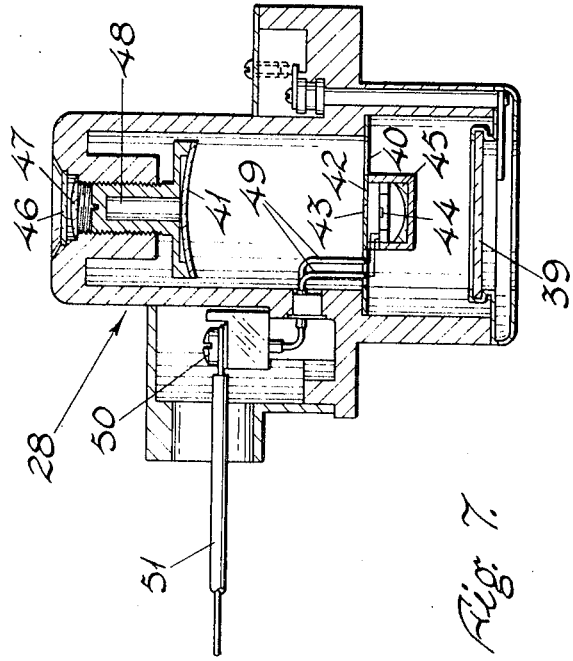
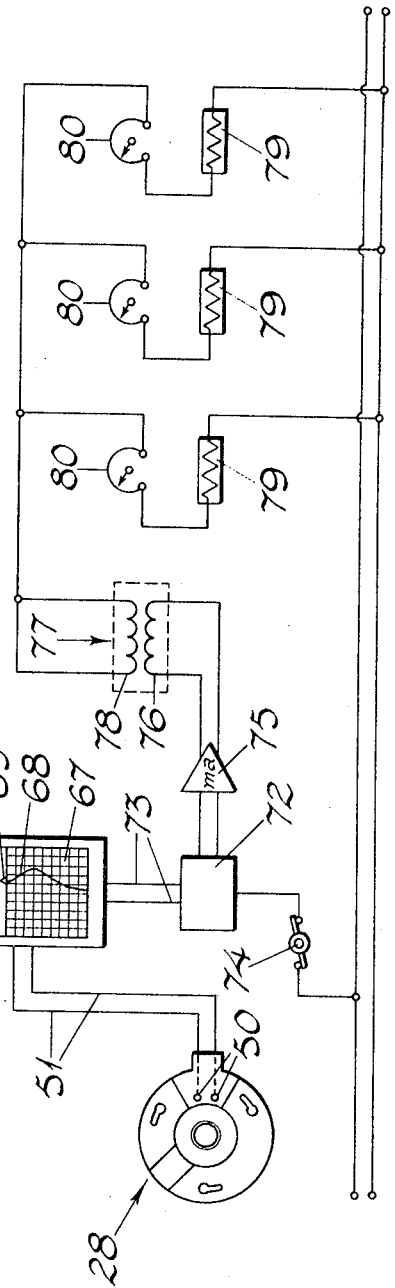
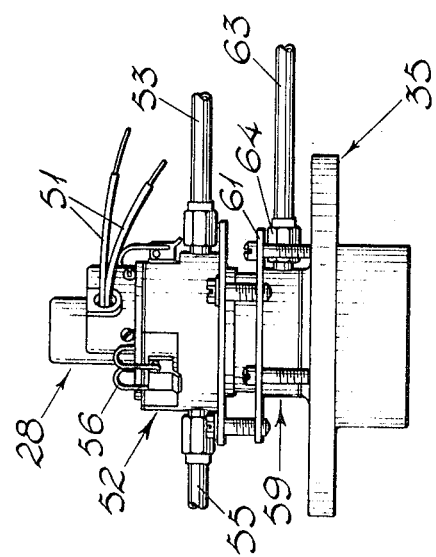
Fig. 7.
Fig. 8.
Fig. 6.
INVENTOR.
Eldwin C. Montgomery
BY
Collins & Oberlin
ATTORNEYS

BATH TEMPERATURE CONTROL IN FLOAT GLASS APPARATUS

BACKGROUND OF THE INVENTION

1. Field of the Invention

The present invention relates broadly to the production of flat glass by the float process and, more particularly, to an improved method and apparatus for automatically controlling the heat input to the tank of a float glass apparatus in response to direct measurement of the temperature of the glass layer as it advances along the surface of the molten metal bath therein. The time required for the heating system to react to fluctuations in the temperature of the glass layer is thus reduced, and undesirable changes in the equilibrium dimensions of the glass ribbon being produced are thereby prevented.

2. Description of the Prior Art

A conventional form of float glass apparatus is shown and described in U.S. Pat. No. 3,083,551, granted Apr. 2, 1963. As therein explained, the manufacture of flat glass by the float process involves the delivery of molten glass at a controlled rate onto a bath of molten metal having a density greater than that of glass (such as tin or alloys of tin, for example) and advancing it along the surface of the molten metal bath under controlled physical and thermal conditions which assure (1) that a layer of molten glass will be established on the bath, (2) that the glass in the layer will be allowed to flow laterally unhindered to develop on the surface of the bath an equilibrium buoyant body of stable thickness, and (3) that the buoyant body will be continuously advanced along the bath and progressively and sufficiently cooled as it advances so as to permit it to be taken unharmed from the bath at the exit end thereof by mechanical means.

As described in column 4, lines 15 to 29 of the patent, the necessity of heat input regulation to maintain thermal conditions which assure the proper development of the equilibrium layer and the subsequent cooling thereof has been recognized. With the prior art systems, the heat input was regulated in response to the temperature of the molten metal bath itself. Thermocouples immersed in the molten metal were employed to indicate the temperature thereof at several locations along the bath. These indicated temperatures were periodically observed and, thereafter, the power input to one or more appropriate sections of conventional electric heaters located in the roof of the tank was adjusted manually to compensate for any local deviations from the desired bath temperature. This system was objectionable, however, in that no matter how frequently the bath temperature was observed, changes in the temperature of the bath atmosphere and the surface of the glass layer on the bath could produce detrimental effects on the quality of the product before such changes affected the temperature of the bath sufficiently to be detected. This presented a particular problem in that area of the bath where the molten glass forms the equilibrium layer, by causing undesirable inconsistencies or variations in the width and thickness of the resulting ribbon.

SUMMARY

According to the present invention, the problem of variation in the dimensions of the glass ribbon is overcome, and temperature fluctuations within the tank are minimized, by automatically adjusting the power input to the heaters on the basis of a comparison of the actual temperature of the surface of the glass layer with a predetermined desired temperature.

It is, therefore, a primary object of the invention to detect and correct changes in the temperature of the glass layer on a float glass bath before the uniformity of the equilibrium layer is affected.

Another object is to automatically control the output of the heaters in a float glass apparatus to compensate for temperature changes in the glass layer.

Still another object is to accurately and directly measure the temperature of the glass layer itself and regulate the heaters in response thereto.

Other objects and advantages of the invention will become apparent during the course of the following description when taken in connection with the accompanying drawings.

BRIEF DESCRIPTION OF THE DRAWINGS

In the drawings wherein like numerals refer to like parts through:

FIG. 1 is a longitudinal, vertical, sectional view through a representative float glass producing tank apparatus embodying the invention;

FIG. 2 is an enlarged, fragmentary sectional view through the ceiling of the tank of FIG. 1 showing the temperature sensing apparatus of the invention mounted therein;

FIG. 3 is an enlarged perspective view of the water cooling head of the apparatus of FIG. 2, with parts cut away;

FIG. 4 is an enlarged perspective view of the air purge nozzle of the apparatus with parts cut away;

FIG. 5 is an enlarged perspective view of the temperature sensing device itself;

FIG. 6 is an enlarged elevational view of the apparatus of FIG. 2, less the sighting tube;

FIG. 7 is an enlarged, vertical, sectional view of the device of FIG. 5; and

FIG. 8 is a schematic diagram of one form of electrical control circuit for the invention.

DESCRIPTION OF THE PREFERRED EMBODIMENTS

Referring now to the drawings, there is illustrated in FIG. 1 a typical float glass apparatus similar to that disclosed in U.S. Pat. No. 3,083,551, wherein molten glass 10 is delivered from the forehearth of a glass melting furnace 11 through and over a spout assembly 12 beneath a blocking tweel 13, with the flow thereof controlled by a control tweel 14.

The glass flows from the spout 12 onto a molten metal bath 15 contained within a tank structure 16 to form a buoyant body of molten glass, indicated at 17, from which a buoyant layer 18 of equilibrium width and thickness develops in ribbon form therefrom.

The headspace 19 above the bath, enclosed by sidewalls 20, entry end wall 21, exit end wall 22 and roof 23, is generally referred to as a plenum chamber, and contains the protective float atmosphere (conventionally, an inert mixture of nitrogen and hydrogen) which protects the bath from oxidation by atmospheric oxygen. The float atmosphere is continually replenished from a system comprising a main supply header 24 with side branches 25 and a plurality of chamber inlet ducts 26.

Electric resistance heaters 27 depend downwardly from and are spaced over the area of the bath roof 23 to provide the required heat input to maintain the desired temperature in the glass layer and bath in a manner to be more fully discussed hereinafter. There is indicated at 28 the temperature sensing apparatus of the invention, also to be more fully described below.

The ultimate ribbon 29, which has undergone progressive cooling from equilibrium formation throughout its advance along the bath, is sufficiently cooled to possess stiffness qualities which allow it to be transferred to a conventional lehr (not shown) on mechanical conveying means without harm to its surfaces. One type of such mechanical conveying means is illustrated by supporting rollers 30, 31 and 32 and superimposed roller 33. Any or all of the rollers 30 to 33 may be driven by conventional mechanical means to apply a tractive effort to the ribbon of glass moving toward the outlet sufficient to advance it along the bath; and a ribbon of less than equilibrium thickness may be produced, is desired, by increasing the speed of the rollers 30 to 33 and thereby increasing their tractional effort and attenuating the equilibrium ribbon 18.

It will be appreciated that the production of an ultimate ribbon 29 of glass of uniform width and thickness is a critical factor in the ecomonic utility of the float process, and the production of such a ribbon is dependent on the development of an equilibrium layer 18 of consistent dimensions from the buoyant body of molten glass 17 since this layer emerges as the ultimate ribbon 29. Temperature control is important because the dimensional stability of the equilibrium layer 18 is dependent on the viscosity of the molten glass 17, which varies with its temperature. Changes in the temperature of the glass layer, particularly in the area of the bath where the equilibrium layer is developed, may produce width and thickness variations therein.

The prior art systems were objectionable in that the degree of control over the temperature of the glass layer was insufficient. The glass layer, located between the molten metal bath and the heat source, receives direct radiation from the heaters. Since the glass layer partially insulates the metal bath from this heat source and contains far less mass on an area basis than does the molten metal therebeneath, it is more responsive than the metal bath itself to changes in the output of the heating elements or the temperature within the plenum chamber 19. Thus, the glass layer produced has been adversely affected by such factors as, for example, daily fluctuations in the voltage supplied to the heating elements due to changes in the total demand on the power source. If the voltage increased, the resulting increase in heat output from the heaters caused the glass layer to increase in temperature, resulting in establishment of a wider and thinner layer of glass on the bath. Conversely, if the voltage decreased, a narrower, thicker layer resulted. Moreover, and because of the time lag between the response of the glass layer and that of the molten metal of the bath, regardless of the frequency with which the thermocouples were checked, inconsistencies occurred in the glass layer before a temperature change in the molten metal bath could be detected and corrected.

The invention contemplates an improved temperature control system which solves this problem. Thus, a temperature sensing device, indicated generally at 28 and as best shown in FIG. 2, is mounted in the tank roof and rigidly affixed to the tank top plate 34 by means of a mounting adapter 35. A hollow sighting or extension tube 36, having a block 37 attached to the lower end thereof and containing an opening 38 extending therethrough, continuous with the hollow section of said tube, extends from the mounting adapter 35 into the plenum chamber 19 through a concentric opening in the tank roof 23 and terminates a short distance above the glass layer. This extension tube allows the temperature sensing device to sight directly on the glass layer without interference from other sources of radiant energy, such as the heaters and walls within the plenum chamber, while allowing the sensing device itself to be situated in an environment of lower ambient temperature outside the tank.

In the temperature sensing device itself, as best shown in FIG. 7, radiation from the heat source sighted through the opening 38 enters through a window 39, passes in part through openings 40 to a curved mirror 41, and is focused and reflected by the mirror 41 to form a sharply defined image on a surface 42. A portion of the radiated heat energy passes through a small, diverging, conically shaped aperture 43 in the surface 42. The aperture allows a portion of the energy to pass around the thermopile 44 in its path, to a mirror 45 which reflects and refocuses the image on the measuring junction of the thermopile 44.

Proper positioning of the detector to measure a specific target area is readily accomplished by sighting the reflected image of the target on the surface 42 through a sight glass 46 and a lens 47 in combination with a hollow chamber 48 and a hole (not shown) in the mirror 41. As the observed image is sighted directly, the position of the detector may readily be adjusted, if necessary.

Wires 49 convey the electrical signal generated by the thermopile 44 in proportional response to the radiant energy focused thereon, to terminals 50. Lead wires 51 (FIG. 8) connect the terminals to a control system as will be hereinafter explained.

To assure that the detector is not itself overheated by its proximity to the heat source, and to keep the thermopile at a more or less constant temperature, a water cooling head 52 (FIG. 3) is provided. Water flows from a source of supply through a flexible inlet hose 53, through a hollow, cylindrical cooling jacket 54, and is discharged through an outlet hose 55 (FIG. 6). The cooling head 52 fits over and encircles the bottom cylindrical portion of the detector, as shown in FIGS. 5 and 6, and is held in place by clamps 56 which are received in slots 57 and force the head against a sealing gasket 58.

An air purge nozzle, shown generally at 59 (FIG. 4) is mounted by conventional means between the water cooling head 52 and the mounting adapter 35 (FIG. 6) to prevent substances such as smoke and fumes from entering the sighting tube 36 (FIG. 2) and influencing the detector reading. As best seen in FIG. 4, this nozzle comprises a hollow, cylindrical portion 60 having an integral mounting flange 61 and enclosing an internal volume 62. A flexible inlet hose 63 is connected thereto by conventional means at 64, and a gasket 65 provides a tight seal against the mounting adapter 35. Compressed gas compatible with the bath atmosphere, supplied to the nozzle through the inlet hose 63, continually enters the internal volume 62 and exits through the opening 38 at the end of the sighting tube 36, thereby purging the closed volume along the sighting path.

Several similar thermoelectric temperature measuring devices are readily available commercially. One particular form which has been successfully used and is illustrated in the preferred embodiment, is known as a Rayotube detector and is manufactured by the Leeds & Northrup Company of Philadelphia, Pa.

FIG. 8 is a schematic diagram illustrating one form of control system for the invention. The converted signal from the temperature sensing device 28 is conducted to a temperature controller 66 through the lead wires 51. The temperature corresponding to this signal is continuously recorded as a line on a strip chart 67 as indicated at 68 by a pointer 69. In addition, the indicated temperature is continuously compared by conventional apparatus with a set point or control temperature, indicated at 70, with knob adjustment therefor at 71. This comparison results in a signal which is transmitted to an electric control unit 72 by conductors 73. Line power is supplied through a disconnect switch 74 and is modulated in accordance with the control signal by a magnetic amplifier 75 located on the primary side 76 of a control transformer 77. Thus, for example, if the reading at 69 is less than that at 70, the voltage to the primary side of the transformer will be increased by an amount directly related to the temperature difference; and if the reading at 69 exceeds that at 70, the reverse will occur.

The change in voltage to the primary side then proportionally affects the output voltage at the secondary side 78 which supplies power to a plurality of parallel connected resistance heaters 79 through rheostats 80 which may be manually adjusted to balance the system, if necessary. The plurality of resistance heaters 79 illustrated in FIG. 8 represents one or more zones or bays of control within the tank. A typical tank apparatus may contain on the order of 15 such zones, each approximately 10 feet in length, consecutively numbered from the entry to the exit end of the tank, and each capable of being operated at a different temperature. Thus, one or more of the zones or combinations of zones may be controlled in this fashion.

A specific example of a successful application of the invention has been achieved in one such apparatus wherein the temperature sensing device of the invention is mounted in Zone 9 for the purpose of controlling the temperature of the glass layer in Zone 7, the point at which the glass layer is reaching its equilibrium dimensions.

Although the preferred embodiment discloses a particular mode of power modulation, it will be appreciated that other conventional systems well known in the art are readily adaptable thereto.

I claim:

1. In a method of producing a continuous sheet of glass by the float process wherein molten glass is deposited on a body of molten metal and moved thereacross while its temperature is controlled at least in part by application of radiant heat to provide a desired longitudinal temperature profile whereby the molten glass spreads under the influence of surface tension and gravity to form a layer of the desired thickness and width and is then gradually cooled so that it can be removed from the molten metal body as a continuous sheet, the improvement comprising sighting directly on a preselected portion of the glass layer and measuring only the radiant energy emitted by said portion without interference from other sources of radiant energy, said measured radiant energy being a function of the actual temperature of said glass layer, converting said radiant energy measurement to said actual glass temperature, and regulating said application of heat in response to said actual glass temperature to maintain said desired temperature profile as said glass layer moves across said body of molten metal.

2. In apparatus for producing float glass including a tank containing a bath of molten metal with an enclosed headspace thereover, means for supplying molten glass to form a buoyant layer on said molten metal, means advancing said layer over said bath and removing it therefrom as a continuous sheet, and a plurality of heating elements in said headspace for maintaining a desired longitudinal temperature profile in said glass layer, the improvement comprising radiant energy sensing means mounted to sight directly on a preselected portion of the glass layer and measure only the radiant energy emitted by said portion while excluding radiant energy from other sources within said tank and enclosed headspace whereby said measured radiant energy is a function of the actual temperature of said preselected portion, means converting said radiant energy measurement to said actual temperature, means comparing said actual temperature with a predetermined desired temperature for said selected portion, and means regulating the heat produced by said heating elements in response to the difference between said actual and desired temperatures to diminish said temperature difference and thereby maintain said desired temperature profile.

3. A method of producing a continuous sheet of glass by the float process as claimed in claim 1, wherein said heat is supplied by a plurality of electrical resistance heating elements located above said glass layer, including comparing said actual temperature with a predetermined desired set point temperature and modulating the power input to said heating elements in response to the difference therebetween.

4. A method of producing a continuous sheet of glass by the float process as claimed in claim 3, wherein said heating elements are electrically connected in groups, including the step of individually controlling said groups to maintain said temperature profile.

5. A method of producing a continuous sheet of glass by the float process as claimed in claim 4, including controlling at least one of said groups located above the layer of glass in the vicinity of stabilization of said layer of glass to maintain said desired dimensions therein.

6. Apparatus as claimed in claim 2, wherein said heating elements are electric resistance elements, and a plurality of said heating elements are parallel connected and mounted in close proximity in said tank roof forming one zone of control thereof.

7. Apparatus according to claim 6, wherein said heating elements comprise a plurality of said zones which are similarly controlled.

8. Apparatus as claimed in claim 6, wherein said means comparing said actual temperature with said predetermined desired temperature is an electronic controller and said regulating means is a magnetic amplifier connected in series with the primary side of a power transformer to modulate the output of said electric resistance elements.

* * * * *